US012686933B2

(12) United States Patent
Unru et al.

(10) Patent No.: US 12,686,933 B2
(45) Date of Patent: Jul. 21, 2026

(54) METHOD FOR OPERATING AN ELECTROLYZER, CONNECTION CIRCUIT, RECTIFIER CIRCUIT, AND ELECTROLYSIS SYSTEM FOR CARRYING OUT THE METHOD

(71) Applicant: SMA Solar Technology AG, Niestetal (DE)

(72) Inventors: Alexander Unru, Baunatal (DE); Arno Gerth, Kassel (DE); Ralf Juchem, Felsberg (DE); Tobias Becker, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 847 days.

(21) Appl. No.: 17/970,698

(22) Filed: Oct. 21, 2022

(65) Prior Publication Data

US 2023/0045707 A1     Feb. 9, 2023

Related U.S. Application Data

(63) Continuation of application No. PCT/EP2021/062341, filed on May 10, 2021.

(30) Foreign Application Priority Data

May 12, 2020    (DE) ..................... 10 2020 112 880.0

(51) Int. Cl.
C25B 15/02       (2021.01)
C25B 1/04        (2021.01)
H02M 3/158       (2006.01)
(52) U.S. Cl.
CPC ................ C25B 15/02 (2013.01); C25B 1/04 (2013.01); H02M 3/1588 (2013.01)

(58) Field of Classification Search
CPC .................................. C25B 1/04; C25B 15/02
See application file for complete search history.

(56) References Cited

U.S. PATENT DOCUMENTS

| | | | |
|---|---|---|---|
| 5,431,796 | A | 7/1995 | Latella |
| 10,214,821 | B2 | 2/2019 | Joos et al. |

(Continued)

FOREIGN PATENT DOCUMENTS

| | | |
|---|---|---|
| CN | 1052153 | 6/1991 |
| CN | 1794553 | 6/2006 |

(Continued)

OTHER PUBLICATIONS

International Search Report dated Aug. 6, 2021 in connection with PCT/EP2021/062341.

*Primary Examiner* — Brian W Cohen
(74) *Attorney, Agent, or Firm* — Eschweiler & Potashnik, LLC

(57) ABSTRACT

The application describes a method for operating an electrolyzer to generate hydrogen from water using an electrolysis reaction, supplied with power from an AC grid via an actively controlled rectifier circuit. The method includes operating the electrolyzer in a normal operating mode with an input voltage $U_{EI}$ above a no-load voltage $U_{LL}$ with predominantly ohmic behavior, operating the electrolyzer in a standby operating mode with an input voltage $U_{EI}$ below the no-load voltage $U_{LL}$ with predominantly capacitive behavior, and transitioning from the standby operating mode to the normal operating mode during a first transition duration $\Delta t_1$, wherein the first transition duration $\Delta t_1$ is reduced by keeping the input voltage $U_{EI}$ at the electrolyzer input during the standby operating mode above a first voltage threshold value $U_{TH,1}$ different from 0V. The application furthermore describes a connection circuit, an (Continued)

actively controlled rectifier circuit and an electrolysis system for performing the method.

15 Claims, 5 Drawing Sheets

(56) References Cited

U.S. PATENT DOCUMENTS

| | | | |
|---|---|---|---|
| 10,947,636 B2 | 3/2021 | Guskov et al. | |
| 11,417,901 B2 | 8/2022 | Ma et al. | |
| 2005/0098430 A1 | 5/2005 | Tuymer et al. | |
| 2012/0031753 A1 | 2/2012 | Roy | |
| 2013/0317959 A1* | 11/2013 | Joos | H02J 3/14 |
| | | | 205/637 |
| 2014/0111128 A1 | 4/2014 | Hensel et al. | |
| 2016/0068976 A1 | 3/2016 | Yoshida et al. | |
| 2021/0317588 A1 | 10/2021 | Falk et al. | |
| 2021/0363651 A1* | 11/2021 | Seymour | H02M 7/219 |
| 2023/0045707 A1 | 2/2023 | Unru et al. | |

FOREIGN PATENT DOCUMENTS

| | | |
|---|---|---|
| CN | 2791070 | 6/2006 |
| CN | 104704147 | 6/2015 |
| CN | 108631636 | 10/2018 |
| CN | 115552056 A | 12/2022 |
| DE | 102014014091 A1 | 3/2016 |
| DE | 102014224013 A1 | 5/2016 |
| DE | 102018133641 A1 | 7/2020 |
| DE | 102019200238 A1 | 7/2020 |
| JP | H07216576 A | 8/1995 |
| JP | 2014087255 A | 5/2014 |
| WO | 2013046958 A1 | 4/2013 |
| WO | 2019246433 A1 | 12/2019 |
| WO | 2020132064 A1 | 6/2020 |

* cited by examiner

METHOD FOR OPERATING AN ELECTROLYZER, CONNECTION CIRCUIT, RECTIFIER CIRCUIT, AND ELECTROLYSIS SYSTEM FOR CARRYING OUT THE METHOD

CROSS REFERENCE TO RELATED APPLICATIONS

This application is a continuation of International Patent Application Number PCT/EP2021/062341, filed on May 10, 2021, which claims priority to German Patent Application number 10 2020 112 880.0, filed on May 12, 2020, and is hereby incorporated by reference in its entirety.

FIELD

The disclosure relates to a method for operating an electrolyzer that is configured to generate hydrogen from water by means of an electrolysis reaction, to a connection circuit, to a rectifier and to an electrolysis system for performing the method.

BACKGROUND

Hydrogen is often generated using an electrolyzer, which converts water into its elements, hydrogen and oxygen, by means of an electrolysis reaction. The electrolyzer is in this case supplied with power from an AC voltage grid (AC grid) by means of an actively controlled rectifier. An electrolyzer typically has a current-voltage characteristic that is divided into two regions by what is known as the no-load voltage $U_{LL}$. Below the no-load voltage $U_{LL}$, the electrolyzer exhibits predominantly capacitive behavior, which is caused by the formation of double layers on electrodes of the electrolyzer. An electrolysis reaction does not yet, or at least not to a significant extent, take place at voltages below the no-load voltage. For input voltages above the no-load voltage $U_{LL}$, the electrolyzer exhibits predominantly ohmic behavior, which is caused by the electrolysis reaction taking place at these voltages. The speed of the electrolysis reaction, and thus the generation rate of hydrogen, for example, is controlled via an input voltage of the electrolyzer and typically increases as the input voltage increases.

Rectifiers having transistors, in particular, insulated-gate bipolar transistors (IGBTs) or metal-oxide field-effect transistors (MOSFETs) as actively controllable semiconductor switches, are increasingly being used as actively controlled rectifiers. A respective freewheeling diode is connected in antiparallel with the transistors in this case. The freewheeling diodes of the rectifier mean that a voltage range at the DC converter output of the AC/DC converter that would otherwise be able to be set via the transistors has a bottom limit of a minimum DC voltage $U_{W,min}$. The limitation is essentially due to the fact that, below the minimum DC voltage $U_{W,min}$ at the output of the AC/DC converter, at least one of the freewheeling diodes is in a conductive state, as a result of which a voltage present on the anode side corresponds to a voltage present on the cathode side of the freewheeling diode, to within a forward voltage of the freewheeling diode. In addition, it is usually desirable to supply power to the electrolyzer, in the case of power consumption close to its nominal power, with the lowest possible conversion losses on the part of the rectifier. The nominal power should be understood here to mean the maximum power at which the electrolyzer is safely able to be operated continuously without being damaged. The nominal power may depend on various components of the electrolyzer and their interaction with one another, and is usually specified by the manufacturer.

The electrolyzers in question usually have a large input voltage range between their no-load voltage $U_{LL}$ and their nominal voltage. The nominal voltage is in this case the voltage present at the input of the electrolyzer and at which the electrolyzer is operated with its nominal power. If suitable measures are then taken, for example through an appropriate design of a transformer connected to an AC input of the rectifier, to ensure that the minimum DC voltage $U_{W,min}$ at the output of the AC/DC converter lies below the no-load voltage $U_{LL}$ of the electrolyzer, this is usually associated with high conversion losses of the actively controlled rectifier at high input voltages of the electrolyzer. The minimum DC voltage $U_{W,min}$ is therefore often above the no-load voltage $U_{LL}$ of the electrolyzer, which however complicates the smooth startup and also the smooth shutdown of the electrolyzer.

When starting the electrolyzer, a considerable capacitance of the electrolyzer has to be charged. It is necessary in this case to limit the current, during precharging, to a value in order to prevent damaging the freewheeling diodes. Specifically, the precharging takes place through a current-limiting precharging resistor. On the other hand, it is desirable to precharge the capacitance as quickly as possible, which requires a resistance value that is as low as possible. However, the lower the ohmic resistance, the higher its power loss and also its component costs. It is possible to pause the hydrogen production, for example, only by disconnecting the electrolyzer from the rectifier. However, due to leakage currents that cannot be completely suppressed, the electrolyzer continues to discharge—possibly to a significant extent depending on the duration of the pause—and has to be restarted. If the electrolyzer is then operated within a consumer facility, for example within an industrial plant, such long electrolyzer charging and discharging durations are disruptive and complicate efficient energy management of the consumer facility. Specifically, under the given conditions, it is not possible, or possible at least only with difficulty, to incorporate the electrolyzer into the energy management of the consumer facility. By way of example, it is desirable to shorten hydrogen production, for example, as part of peak load shaving of the consumer facility in a calculation period in order instead to continue it in the subsequent calculation period. This requires a precharging duration in the range of a few seconds, advantageously, for example, at most 2 s.

A backup power supply for an electrolyzer that is used for the electrolysis of an aqueous NaCl solution is known from document FR2972200A1. In the case of such an electrolyzer, it is necessary to polarize the input of the electrolyzer even in the event of failure of its normal power supply, which comes from an AC grid connected to a rectifier, even in the event of failure of the AC grid. For this purpose, an input of the electrolyzer is connected to the AC grid via a rectifier, a battery, a DC/DC converter and a diode. If the AC grid as normal power supply fails, then the input of the electrolyzer remains polarized via the battery, the DC/DC converter and the diode.

Document DE 10 2019 200 238 A1 discloses a method for carbon dioxide reduction by means of an electrolyzer, in which salinization is counteracted by recurring regeneration phases with applied protection potential and electrolyte flushing.

Document WO 2020 132064 A1 discloses a method for operating a carbon oxide (COx) reduction reactor. The method comprises turning off or reducing the power or controlling it in some other way during various stages of operation.

Document DE 10 2014 224 013 A1 discloses a method for carbon dioxide utilization by means of an electrolysis cell, in which a protective voltage is applied to a cathode in a rest mode and in which the electrodes would be attacked by the electrolyte solution without the application of the protective voltage.

Document WP 2019/246433 A1 discloses an operating method for a DC distribution system. The method comprises a first voltage conversion using an active rectifier that converts a first input AC voltage to a first output DC voltage and supplies it to a DC bus. The first output DC voltage of the DC bus is supplied to a second input of a buck converter as second input DC voltage, which buck converter converts it into a second output DC voltage via a second voltage conversion and supplies it to a DC load, for example a electrolysis cell stack.

Document DE 10 2018 133 641 A1 describes a method for operating an electrolysis device with a converter and an electrolyzer. On the AC voltage side, the converter is connected to an AC voltage grid via a decoupling impedance and is operated with voltage injection. On the DC voltage side, the electrolyzer is connected to the converter. The electrolysis device is operated, at a grid frequency that corresponds to a nominal frequency of the AC voltage grid and is temporally constant, with an electric power that is between 50% and 100% of a rated power of the electrolyzer. The method makes it possible to provide an instantaneous reserve power for the AC voltage grid.

SUMMARY

The disclosure is directed to a method for operating an electrolyzer, wherein a hydrogen production of the electrolyzer, for example, a hydrogen production by means of an electrolysis reaction performed on water, and thus an electrical load drawn by the electrolyzer is able to be regulated in a highly dynamic manner. When using an actively controlled rectifier, it should, for example, firstly be possible to temporarily pause the production of hydrogen. The temporary pausing should in this case as far as possible be able to extend over a period of a few minutes up to a few hours. In addition, a transition from a normal operating mode with electrolysis reaction, that is to say hydrogen production, to a standby operating mode with an at least largely suppressed electrolysis reaction, that is to say hydrogen production, and vice versa, should in this case take place as quickly as possible. The disclosure is also directed to a connection circuit suitable for performing the method and a rectifier circuit having such a connection circuit. The disclosure is also directed to an electrolysis system that is suitable for performing the method.

The method according to the disclosure relates to the operation of an electrolyzer that is configured to generate hydrogen from water by means of an electrolysis reaction. The electrolyzer is supplied with power from an AC voltage grid (AC grid) via an actively controlled rectifier circuit. The method comprises operating the electrolyzer in a normal operating mode with an input voltage $U_{EI}$ above a no-load voltage $U_{LL}$ of the electrolyzer with predominantly ohmic behavior, operating the electrolyzer in a standby operating mode with an input voltage $U_{EI}$ below the no-load voltage $U_{LL}$ of the electrolyzer with predominantly capacitive behavior, and transitioning from the standby operating mode to the normal operating mode during a first transition duration $\Delta t_1$. The first transition duration $\Delta t_1$ is reduced compared to conventional methods by keeping the input voltage $U_{EI}$ at the input of the electrolyzer during the standby operating mode above a first voltage threshold value $U_{TH,1}$ different from 0 V (e.g., non-zero).

The electrolyzer is configured to generate hydrogen from water through an electrolysis reaction. Such electrolyzers are increasingly being operated in larger consumer facilities, for example, industrial plants. In this case, they may be used, on the one hand, to cover the hydrogen demand of the industrial plant through local hydrogen production. On the other hand, it is desirable to dynamically regulate electric power consumption of the electrolyzer such that the electrolyzer is able to participate in local energy management of the consumer facility. For this purpose, the electrolyzer has, on the one hand, the normal operating mode, in which an electrolysis reaction, for example, a hydrogen-generating decomposition of water, takes place. In one embodiment, the electrolysis reaction takes place above the no-load voltage $U_{LL}$ with at least predominantly ohmic behavior of the electrolyzer, possibly also with completely ohmic behavior of the electrolyzer. The speed of the electrolysis reaction influences the electric power consumption of the electrolyzer, and is controlled by means of the actively controlled rectifier circuit via the input voltage $U_{EI}$ of the electrolyzer. In one embodiment, in the standby operating mode with an input voltage $U_{EI}$ below the no-load voltage $U_{LL}$, the electrolyzer exhibits at least predominantly capacitive behavior, possibly also completely capacitive behavior. An electrolysis reaction does not take place here, at least not to a significant extent. Since, in the standby operating mode, the input voltage $U_{EI}$ of the electrolyzer is kept above the first voltage threshold value $U_{TH,1}$ different from 0 V, a capacitance associated with or inherent to the electrolyzer remains precharged to a certain degree even in the standby operating mode. Less charge transport into the electrolyzer is thus required in order to raise its input voltage $U_{EI}$ to a value above the no-load voltage than would be the case, for example, in the case of the electrolyzer being restarted with its associated capacitance completely discharged. Since less charge has to be transported, it is also possible to keep a transition duration $\Delta t_1$ between the standby operating mode and the normal operating mode very small, with an otherwise similar current between the actively controlled rectifier circuit and the electrolyzer. Due to the short transition duration $\Delta t_1$, in one embodiment it is possible to pause the electrolysis reaction in the standby operating mode and carry out a power-consuming electrolysis reaction in the normal operating mode in a highly dynamic manner and without significant dead times. Due to the short transition duration $\Delta t_1$, it is possible to integrate an operating behavior of the electrolyzer into energy management of the consumer facility significantly better than would be the case with long transition durations. The input voltage $U_{EI}$ of the electrolyzer may in this case be kept above the first voltage threshold value $U_{TH,1}$ with no, or at least with reduced hardware outlay, in one embodiment. By way of example, a connection circuit that is already present may often be used, meaning that no additional hardware outlay is required in this case. It is therefore possible to implement the method with barely any associated additional outlay and therefore extremely inexpensively.

Since the input voltage $U_{EI}$ of the electrolyzer in the standby operating mode is kept above the first voltage threshold value $U_{TH,1}$ different from 0 V, the first transition duration $\Delta t_1$ from the standby operating mode to the normal operating mode is able to be minimized due to less charge transport associated therewith. However, the lesser extent of charge transport required for changing the operating mode does not only have an effect during a transition from the standby operating mode to the normal operating mode. It moreover makes it possible to minimize a second transition duration $\Delta t_2$ from the normal operating mode to the standby operating mode. One advantageous variant of the method may therefore comprise transitioning from the normal operating mode to the standby operating mode during a second transition duration $\Delta t_2$, wherein the second transition duration $\Delta t_2$ is reduced compared to conventional methods by keeping the input voltage $U_{EI}$ at the input of the electrolyzer during the standby operating mode above the first voltage threshold value $U_{TH,1}$ different from 0 V.

The closer the first voltage threshold value $U_{TH,1}$ to the no-load voltage, the shorter the first transition duration $\Delta t_1$ may be kept. On the other hand, however, it should be taken into account that an electrolysis reaction does not start suddenly when the no-load voltage is exceeded. Rather, the electrolysis reaction will set in in a narrowly defined area around the no-load voltage $U_{LL}$ and increase strongly and continuously there as the input voltage $U_{EI}$ increases. In order to safely pause the electrolysis reaction in the standby operating mode, it is therefore necessary to comply with a safety distance from the no-load voltage. According to one embodiment of the method, the first voltage threshold value $U_{TH,1}$ may then correspond to a value of at least 80%, or at least 90% of the no-load voltage $U_{LL}$ of the electrolyzer. As an alternative or in addition, the input voltage $U_{EI}$ at the input of the electrolyzer in the standby operating mode may be kept at least 5% below the no-load voltage $U_{LL}$ of the electrolyzer in one embodiment. These values have a corresponding tolerance band for the input voltage $U_{EI}$ of the electrolyzer between at least 80% and at most 95%, or between at least 90% and at most 95% of the no-load voltage $U_{LL}$ of the electrolyzer. Within these tolerance bands, the first transition duration $\Delta t_1$ from the standby operating mode to the normal operating mode may be limited to a value of at most 10 s, or at most of 5 s.

According to one embodiment of the method, the input voltage $U_{EI}$ of the electrolyzer in the standby operating mode may be kept above the first voltage threshold value $U_{TH,1}$ by connecting the input of the electrolyzer to a DC converter output of an AC/DC converter assigned to the actively controlled rectifier circuit in a clocked manner via a precharging resistor and/or an inductor. The actively controlled rectifier circuit may in this case remain connected to the AC grid on the input side. In conjunction with freewheeling diodes present within the AC/DC converter, a DC voltage is thereby maintained at the DC converter output, which DC voltage may by all means be greater than the no-load voltage $U_{LL}$ of the electrolyzer. The clocked connection may be implemented in one embodiment by use of a circuit breaker arranged in series with the precharging resistor or in series with the inductor. In a case in which the input of the electrolyzer is connected to the DC converter output of the AC/DC converter in a clocked manner via the precharging resistor, this results in active time windows (when the circuit breaker is closed) with a current flow into the input of the electrolyzer and inactive time windows (when the circuit breaker is open) during which no current flows into the input of the electrolyzer. The input voltage $U_{EI}$ of the electrolyzer rises during the active time windows, while it drops again during the inactive time windows, for example, due to leakage currents that are never able to be completely prevented. According to one embodiment of the method, the clocked connection of the input of the electrolyzer to the DC converter output may be implemented in a voltage-controlled manner, for example, using a two-point control. The input voltage $U_{EI}$ of the electrolyzer may in this case be used as a feedback signal for the control. A precharging resistor having a circuit breaker arranged in series therewith is often already present in the combination of actively controlled rectifier circuit and electrolyzer in question, and therefore does not generate any additional costs. In a case in which the input of the electrolyzer is connected to the DC converter output of the AC/DC converter in a clocked manner via the inductor, the inductor may be part of a DC/DC converter, in particular a buck converter, which is arranged between the AC/DC converter and the DC output of the rectifier circuit. When the circuit breaker is closed, a current increase is throttled by the inductor, and when the circuit breaker is open, a current decrease is driven by the inductor. In this case, the buck converter may operate in a mode with or without interruptions.

In one embodiment of the method, a minimum DC voltage $U_{W,min}$ at the DC converter output of the AC/DC converter may be above the no-load voltage $U_{LL}$ of the electrolyzer. This may be achieved, for example, through a suitable design of a transformer connected upstream of the actively controlled rectifier circuit on the input side and by way of which the rectifier circuit is connected to the AC grid. Specifically, the transformer may be configured so that an AC voltage of the AC grid with the amplitude UAC is transformed into an AC voltage present at the AC input of the rectifier circuit with the amplitude U1, wherein the amplitude U1, in conjunction with the freewheeling diodes present inside the AC/DC converter, generates a minimum DC voltage $U_{W,min}$ at the DC converter output that is above the no-load voltage $U_{LL}$ of the electrolyzer. Such a design with regard to the minimum DC voltage $U_{W,min}$ present at the DC converter output conversely means minimized conversion losses if the electrolyzer is intended to be operated with a high input voltage $U_{EI}$.

According to one embodiment of the method, the electrolyzer may additionally be operated in a maintenance operating mode under specified boundary conditions, in which maintenance operating mode the input voltage $U_{EI}$ of the electrolyzer is below a hazardous voltage value. This is the case, for example, when repair and/or maintenance work needs to be carried out on the electrolyzer and/or the active rectifier circuit and personal injury caused by an electric shock must be reliably ruled out. These hazardous voltage values may be specified in a country-specific manner. In particular, it is possible in this case for the input voltage of the electrolyzer to be at a value of 0 V. However, such a maintenance operating mode is then subsequently associated with a prolonged precharging duration for the electrolyzer. However, since the maintenance operating mode is used only in a few cases, an associated prolonged charging duration, possibly also an associated prolonged discharging duration of the electrolyzer, is tolerable.

In a further embodiment of the method, the electrolyzer may be assigned to a consumer facility, for example, an industrial plant, and may be connected, together with other electrical consumers and/or generators of the consumer facility, to the AC grid supplying power to the consumer facility via a common grid connection point. In the case of larger consumer facilities in particular, it is customary to specify the maximum permitted energy draw from the AC grid within a calculation period. This gives an energy supplier of the consumer facility a planning basis with regard to electric power to be generated on average over time during the calculation period. Compliance with the maximum energies agreed during the calculation periods is usually monitored and controlled via an energy management system EMS of the consumer facility. The electrolyzer constitutes an essential consumer of the consumer facility in one embodiment. In one embodiment of the method, operation of the electrolyzer and/or operation of at least one component that supplies electric power to the electrolyzer may therefore be controlled via a control circuit of the consumer facility that performs energy management. The at least one component that supplies power to the electrolyzer may in particular comprise the connection circuit described below and/or the active rectifier circuit described below. At least one change between the normal operating mode and the standby operating mode of the electrolyzer may in this case take place during a calculation period with the aim of ensuring that a maximum energy $\Delta E$ agreed between the consumer facility and an energy supplier for the calculation period is not exceeded. It may be advantageous in one embodiment if the first transition duration $\Delta t_1$, possibly also the second transition duration $\Delta t_2$, fall below a value of at most 5%, in particular at most 2%, of a duration of the calculation period. The electrolyzer may thereby be integrated efficiently into the EMS of the consumer facility. The control circuit of the consumer facility may be designed as a separate control circuit. As an alternative thereto, however, it may also be partially or fully implemented in pre-existing control circuits of components of the consumer facility.

In one embodiment, a connection circuit according to the disclosure is arranged between a DC source and an electrolyzer. The connection circuit comprises an input having two input connections for connecting the connection circuit to the DC source, and an output having two output connections for connecting the connection circuit to the input of the electrolyzer. The connection circuit further comprises a series connection of a precharging resistor and a circuit breaker or a series connection of an inductor and a circuit breaker, wherein the series connection connects one of the input connections to a corresponding one of the output connections, a further circuit breaker that is arranged in parallel with the precharging resistor, in parallel with the series connection of the precharging resistor and the circuit breaker or in parallel with the series connection of the inductor and the circuit breaker. The connection circuit also comprises a measuring circuit or device configured to determine a voltage difference between a DC voltage $U_{EI}$ present at the output and a DC voltage $U_Q$ present at the input, and a control circuit configured to control the connection circuit, for example, the circuit breaker and the further circuit breaker. The connection circuit is configured, in one embodiment, in conjunction with the DC source and optionally a control circuit of a consumer facility that performs energy management to operate the electrolyzer in accordance with the method according to the disclosure.

In one embodiment the DC source may be a DC converter output of an AC/DC converter, which is connected to an AC grid at its AC converter input. In one embodiment the AC/DC converter may be assigned to an actively controlled rectifier circuit. The control circuit of the connection circuit may be connected to the control circuit of the consumer facility in terms of communication and/or control. This results in the advantages already described in connection with the method.

According to one embodiment of the connection circuit, the circuit breaker may comprise a semiconductor switch and/or an electromagnetic switch. In one embodiment, the "and" stands for what is known as a hybrid switch, which comprises an electromechanical switch with a semiconductor switch arranged in parallel therewith. The hybrid switch makes it possible to suppress a switching arc, as would otherwise occur if an electromechanical switch were used on its own. The same likewise applies to the further circuit breaker of the connection circuit. In one embodiment of the connection circuit, in which the series connection of the connection circuit is formed via the circuit breaker and the inductor, the connection circuit may be configured as a DC/DC converter, in particular as a buck converter. For this purpose, the connection circuit may have a further semiconductor switch that connects another of the two input connections to a connection point of the circuit breaker and the inductor. The further semiconductor switch may be a diode or an actively controlled semiconductor switch.

In one embodiment, a rectifier circuit according to the disclosure is embodied as an actively controlled rectifier circuit. In one embodiment it is used to supply power to an electrolyzer from an AC grid having an AC voltage and comprises an AC input having multiple input connections for the connection of the AC grid and a DC output having two output connections for the connection of the electrolyzer, an AC/DC converter having a converter circuit that comprises semiconductor switches with freewheeling diodes connected in antiparallel therewith, and a rectifier circuit control circuit for driving the semiconductor switches of the rectifier circuit. In one embodiment, the rectifier circuit according to the disclosure additionally comprises a connection circuit according to the disclosure.

In one embodiment, the actively controlled rectifier circuit may be a single-stage rectifier that is free from any DC/DC converter arranged between the AC/DC converter and the DC output of the rectifier circuit. This is the case, for example, when the series connection of the connection circuit is formed by the circuit breaker and the precharging resistor. As an alternative thereto, it is possible for the rectifier circuit to be designed as a two-stage rectifier circuit that comprises a DC/DC converter arranged between the AC/DC converter and the DC output of the rectifier circuit. The DC/DC converter may, in one embodiment, be a buck converter. This is the case, for example, when the series connection of the connection circuit is formed by the circuit breaker and the inductor arranged in series with the circuit breaker. The multiple input connections of the rectifier circuit may comprise a phase connection and a neutral connection. As an alternative, it is possible for the multiple input connections to comprise multiple phase connections, for example, three phase connections. In the case of multiple phase connections, the input connections may additionally comprise a neutral connection, but this is not mandatory. The AC/DC converter of the rectifier circuit—and thus also the rectifier circuit itself—may be operated bidirectionally with regard to the flow of power that it converts. In this case, it is possible for the AC/DC converter to be operated in a voltage-regulating manner. In voltage-regulating operation, a power exchange between the AC/DC converter and the AC grid connected thereto may be controlled via one or more characteristics, for example, an active power/frequency characteristic and/or a reactive power/voltage characteristic. This allows the active rectifier circuit to operate in a manner that reacts as instantaneously as possible in a grid-conducive or grid-supporting manner. The rectifier control circuit may be configured to control not only the semiconductor switches of the rectifier circuit but also other components of the rectifier circuit, for example an AC disconnection circuit that is arranged between the AC converter input of the AC/DC converter and the AC input of the rectifier circuit. In one embodiment the control circuit of the connection circuit may be embodied as a separate control circuit. As an alternative thereto, it is possible for the control circuit of the connection circuit to be part of the rectifier control circuit, provided that the latter is dimensioned appropriately. This also results here in the advantages already explained in connection with the method.

In one embodiment, an electrolysis system according to the disclosure comprises an actively controlled rectifier circuit and an electrolyzer connected to the actively controlled rectifier circuit on the output side. The electrolysis system may be connected to the AC grid supplying power to the electrolyzer directly (e.g., via the actively controlled rectifier circuit) or with the interposition of a transformer (e.g., the transformer being assigned to the electrolysis system or separate or external to the electrolysis system). In one embodiment, the electrolysis system may comprise a signalling apparatus that is configured to signal a current operating mode of the electrolyzer. This makes it possible, for example, to indicate a standby operating mode of the electrolyzer, since in this case no electrolysis reaction takes place and—apart from the live input of the electrolyzer and possibly other live components of the electrolysis system— the external appearance otherwise differs little from the maintenance operating mode. As an alternative or in addition, the electrolysis system may likewise comprise a blocking apparatus that is configured to prevent touching of live components of the electrolysis system in the standby operating mode and optionally also in the normal operating mode. It is possible for the blocking apparatus to deactivate its blocking effect when the electrolyzer or other live components of the electrolysis system have been discharged to values below the hazardous voltage values. Personal injury that could otherwise result from touching live components may thereby be safely ruled out.

According to one embodiment of the electrolysis system, the electrolysis system may be configured as part of a consumer facility and may be controlled via a control circuit of the consumer facility that performs energy management. The electrolyzer, the connection circuit and/or the rectifier circuit of the electrolysis system may in this case, for example, be controlled by the control circuit assigned to the consumer facility.

Other embodiments of the disclosure are specified in the following description and in the dependent claims, the features of which may be applied individually and in any combination with each other.

BRIEF DESCRIPTION OF THE FIGURES

The disclosure is illustrated below with the aid of figures. In the figures

DETAILED DESCRIPTION

Figure 1:
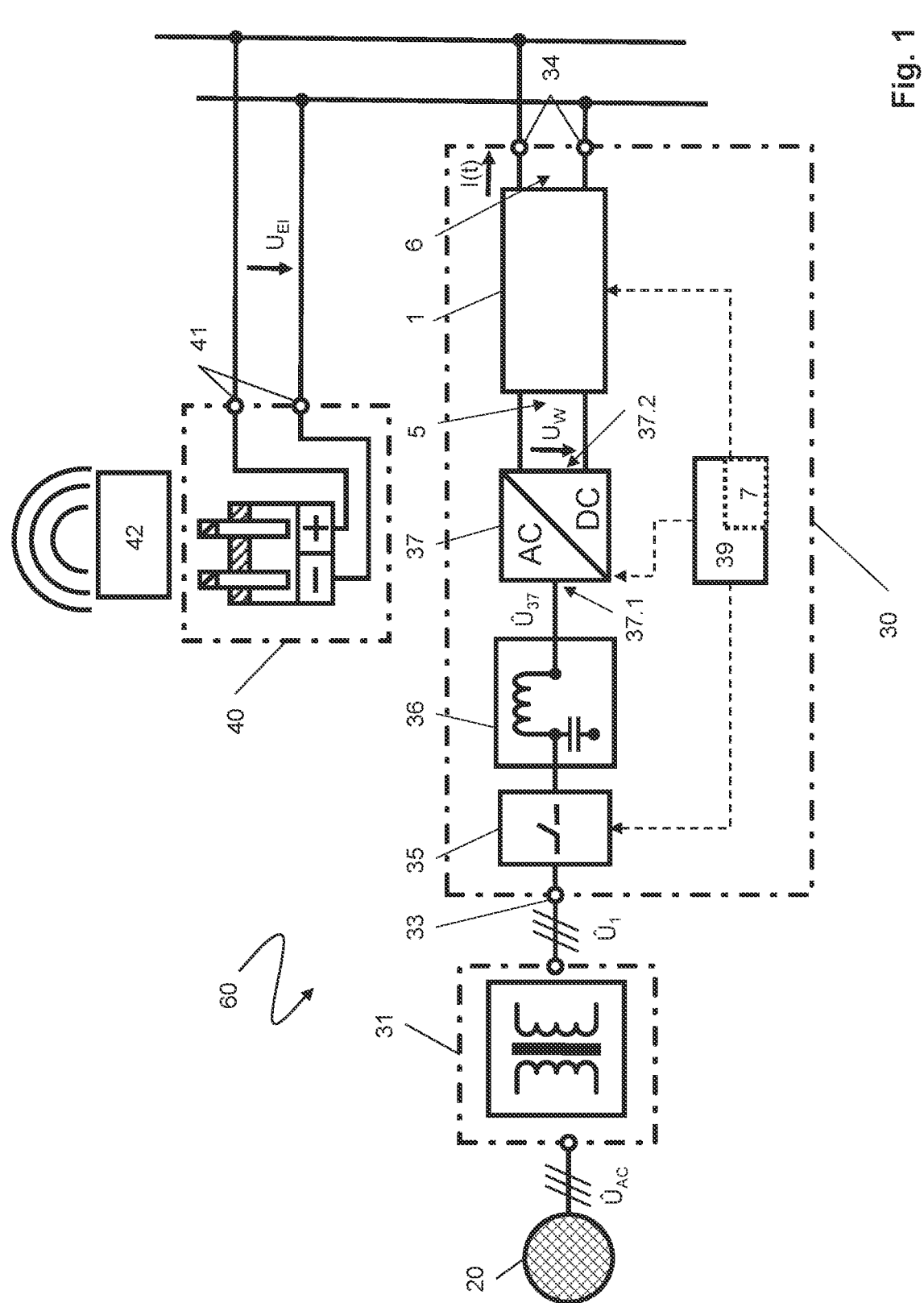
FIG. 1 shows one embodiment of an electrolysis system according to the disclosure.

FIG. 1 illustrates one embodiment of an electrolysis system 60 according to the disclosure. The electrolysis system 60 contains an actively controlled rectifier circuit 30 that is connected to an AC voltage grid (AC grid) 20 at its AC input 33 via a transformer 31. A DC output 34 of the rectifier circuit 30 is connected to an input 41 of an electrolyzer 40. The actively controlled rectifier circuit 30 comprises an AC disconnection circuit 35, a filter circuit 36 for reducing/damping the propagation of high-frequency interfering signals in the AC grid 20, and an AC/DC converter 37. The AC/DC converter 37 is circuitry configured to convert an AC voltage with the amplitude $\hat{U}_{37}$ present at an AC converter input 37.1 into a DC voltage $U_W$ present at a DC converter output 37.2. For this purpose, semiconductor switches of the AC/DC converter 37 are driven appropriately by a rectifier control circuit 39. The rectifier control circuit 39 is also able to drive the AC disconnection circuit 35, and possibly also other components of the rectifier circuit 30 or of the electrolysis system 60. A connection circuit 1 according to the disclosure is arranged between the DC converter output 37.2 and the DC output 34 of the rectifier circuit and is connected to the DC converter output 37.2 at its input 5 and to the DC output 34 of the rectifier circuit 30 at its output 6. The connection circuit 1 additionally comprises a control circuit 7 for driving its components, which control circuit is embodied in one embodiment as part of the rectifier control circuit 39 in FIG. 1, by way of example. As an alternative, however, it is also possible for the rectifier control circuit 39 and the control circuit 7 of the connection circuit 1 each to be embodied as separate control circuits. The electrolysis system 60 additionally comprises a signalling circuit, device, or apparatus 42 for signalling a current operating mode of the electrolyzer 40. It may additionally optionally comprise a blocking apparatus (not illustrated in FIG. 1), which prevents people coming into contact with live components of the electrolysis system 60 in the standby operating mode and/or in the normal operating mode of the electrolyzer 40.

With the connection circuit 1 according to the disclosure, which is explained in more detail in one embodiment in FIG. 2, the rectifier circuit 30 is configured as a rectifier circuit according to the disclosure and configured to control operation of the electrolyzer 40 in accordance with the method according to the disclosure. The electrolyzer 40 may in this case be operated in a normal operating mode with an input voltage $U_{EI}$ above its no-load voltage $U_{LL}$. In the normal operating mode, an electrolysis reaction takes place in the electrolyzer 40, for example, a decomposition of water into its components, hydrogen and oxygen, wherein the electrolyzer 40 essentially behaves like an ohmic consumer. In this case, a speed of the electrolysis reaction is controlled by means of the rectifier circuit 30 by varying the input voltage $U_{EI}$ of the electrolyzer 40. The electrolyzer 40 may additionally be operated below the no-load voltage $U_{LL}$ in a standby operating mode in which there is no, but at least no significant electrolysis reaction, and thus no—at least no significant—electric power consumption of the electrolyzer 40.

In order then to achieve a small value of a first transition duration $\Delta t_1$ from the standby operating mode to the normal operating mode (e.g., a quick transition), as well as a small value of a second transition duration $\Delta t_2$ from the normal operating mode to the standby operating mode, the input voltage $U_{EI}$ of the electrolyzer 40 is kept above a first threshold value $U_{TH,1}$ different from 0 V in the standby operating mode as well. The first threshold value $U_{TH,1}$ may be selected in one embodiment such that it is 80%, preferably 90%, of the no-load voltage $U_{LL}$ of the electrolyzer 40. The input voltage $U_{EI}$ should however advantageously not exceed a value of 95% of the no-load voltage of the electrolyzer according to one embodiment. The first transition duration $\Delta t_1$, as well as the second transition duration $\Delta t_2$, may thereby be limited to a value of 1 s to a few seconds. By means of such a dynamic change in the operating states, the electrolysis system 60 is able to be efficiently integrated into an energy management system of a consumer facility, for example, an industrial plant, that comprises the electrolysis system 60.

The transformer 31 and also the rectifier circuit 30 in FIG. 1 are illustrated in one embodiment as a three-phase rectifier circuit 30 by way of example. As an alternative thereto, however, it is also possible for the AC grid, the transformer 31 and also the rectifier circuit 30 to be embodied as single-phase components and each have a phase conductor and a neutral connection. It is also possible for them to have a different number of phase conductors, for example, two phase conductors. Within the scope of the disclosure, a direct connection of the rectifier circuit 30 to the AC grid 20 without the interposition of the transformer 31 is also possible.

Figure 2A:
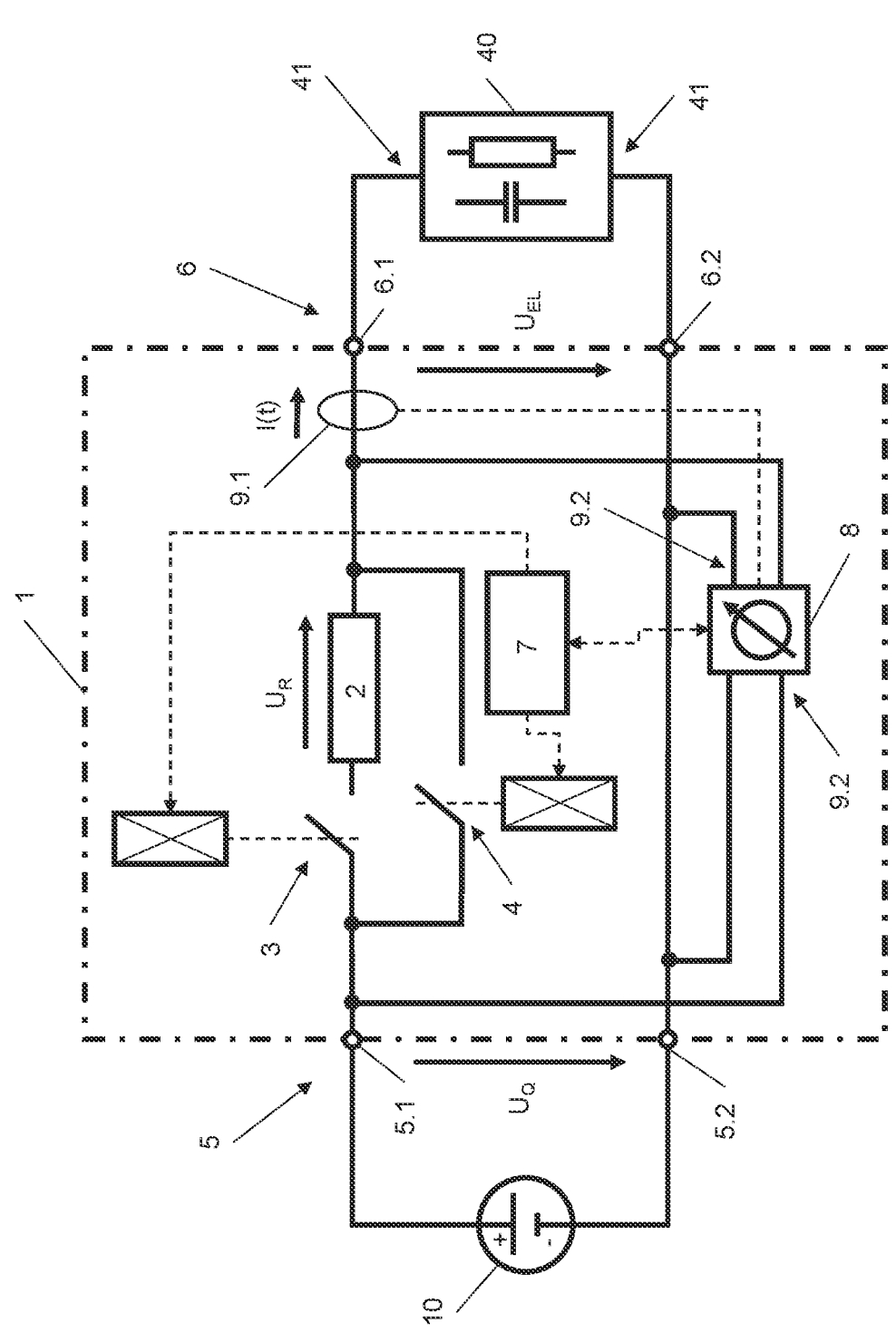
FIG. 2*a* shows a first embodiment of a connection circuit according to the disclosure.

FIG. 2a illustrates a first embodiment of a connection circuit 1 according to the disclosure. The connection circuit 1 comprises an input 5 having two input connections 5.1, 5.2 for the connection of a DC source 10, and an output 6 having two output connections 6.1, 6.2 for the connection of the electrolyzer 40. The DC source 10 may, in one embodiment, be an AC/DC converter 37 connected to an AC grid 20 on the input side. One of the input connections 5.1, 5.2 of the connection circuit 1 is connected to a corresponding one of the output connections 6.1, 6.2 via a series connection of a precharging resistor 2 and a circuit breaker 3. A further circuit breaker 4 is arranged in parallel with the series connection. The connection circuit 1 additionally comprises a measuring circuit or device 8 having a voltage sensor 9.2 for detecting a DC voltage $U_{EI}$ present at the output 6 and thus also at the electrolyzer 40, and a further voltage sensor 9.2 for detecting a DC voltage $U_Q$ present at the input 5. The measuring circuit or device 8 additionally has a current sensor 9.1 for detecting a current I(t) flowing via the output 6. The circuit breaker 3 and the further circuit breaker 4 are controlled by the control circuit 7 of the connection circuit 1. The control circuit 7 is additionally configured to communicate with the measuring circuit or device 8 and to drive the measuring circuit or device 8, which is symbolized by a control line illustrated in dashed form.

In the normal operating mode of the electrolyzer 40, the further circuit breaker 4 of the connection circuit 1 is permanently closed, such that the electrolyzer 40 is connected with low resistance to the DC source 10. The circuit breaker 3 may in this case be open or likewise closed. In the standby operating mode of the electrolyzer 40, the further circuit breaker 4 is permanently open. The circuit breaker 3 is closed and opened again in a clocked manner. The clocked opening and closing of the circuit breaker 3 may in this case take place depending on the detected DC voltage $U_{EI}$ present at the output 6, and thus present at the input 41 of the electrolyzer 40. It is thereby possible to implement a two-point control of the input voltage $U_{EI}$ of the electrolyzer 40, which leads to a temporal profile of the input voltage $U_{EI}$ of the electrolyzer, as will be explained in more detail in connection with FIG. 4.

Figure 2B:
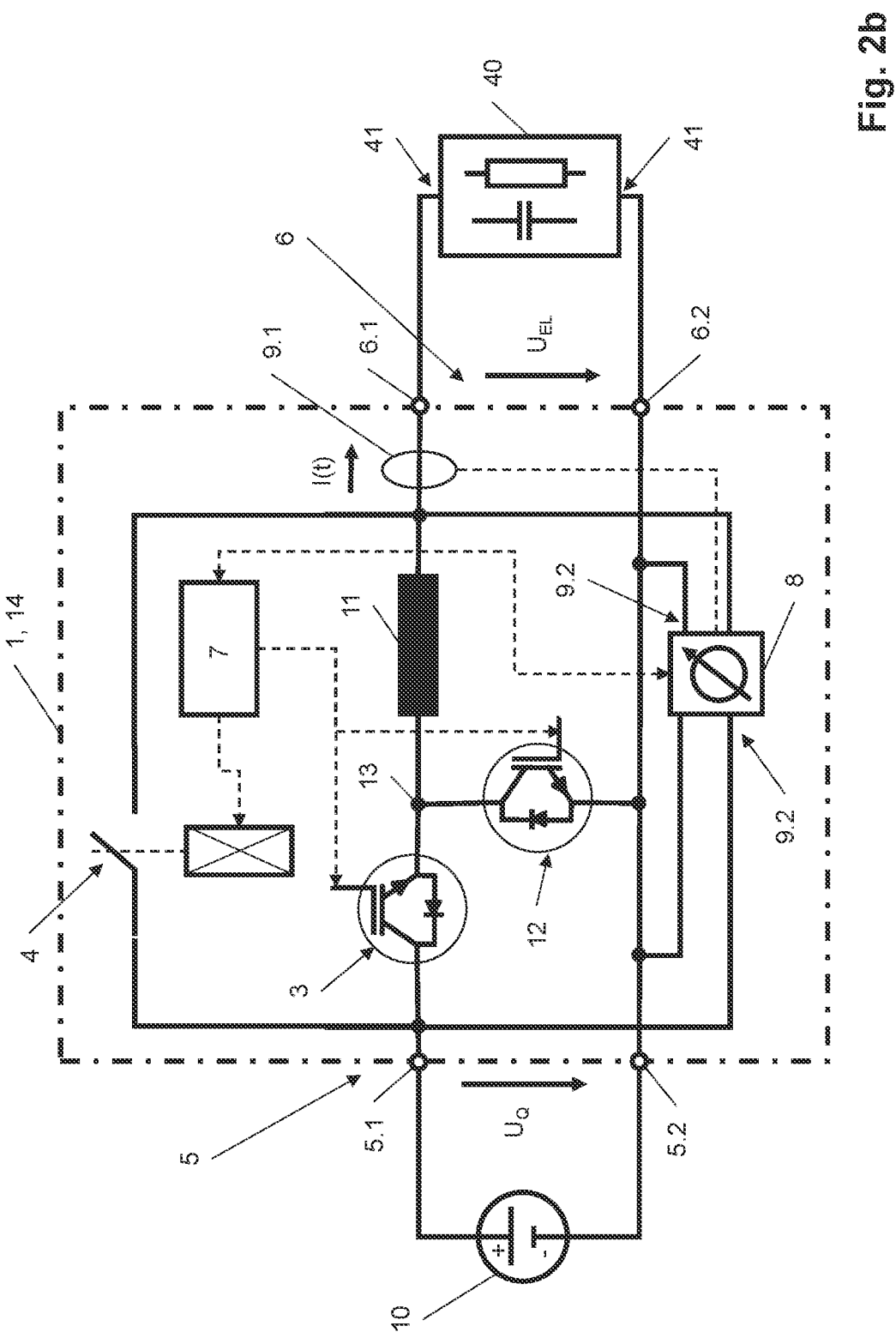
FIG. 2*b* shows a second embodiment of a connection circuit according to the disclosure.

FIG. 2b illustrates a second embodiment of the connection circuit 1 according to the disclosure, which has many features in common with the first embodiment of the connection circuit according to FIG. 2a. The differences from the first embodiment of the connection circuit are therefore mainly explained below, while reference is made to the explanations under FIG. 2a for the features in common.

According to the second embodiment, the connection circuit 1 is embodied as a DC/DC converter, for example, as a buck converter 14. In this case, the first input connection 5.1 of the connection circuit 1 is connected to the corresponding output connection 6.1 via a series connection of the circuit breaker 3 and an inductor 11. The circuit breaker 3 is designed, in FIG. 2b, as an actively controllable semiconductor switch and is driven by the control circuit 7. The connection circuit 1 furthermore has a further semiconductor switch 12 that connects a connection point 13 between the circuit breaker 3 and the inductor 11 to the other input connection 5.2 of the connection circuit 1. In FIG. 2b, the further semiconductor switch 12 is configured as an actively controllable semiconductor switch that is likewise driven by the control circuit 7. As an alternative thereto, however, it is also possible for the further semiconductor switch 12 to be embodied as a diode. The further circuit breaker 4 of the connection circuit 1 is designed as an electromechanical circuit breaker and is arranged in parallel with the series connection of the circuit breaker 3 and the inductor 11.

During the standby operating mode of the electrolyzer 40, the DC voltage $U_Q$ present at the input 5 is able to be converted into a DC voltage $U_{EI}$ present at the output 6 through appropriate driving of the circuit breaker 3 and the further semiconductor switch 12. The further circuit breaker 4 is in this case permanently open and the output voltage $U_{EI}$ is kept above the first voltage threshold value $U_{TH,1}$ through clocked operation of the circuit breaker 3 and the further semiconductor switch 12. During the normal operating mode, the further circuit breaker 4 is permanently closed, such that the first input connection 5.1 is connected with low impedance to the first output connection 6.1. The further semiconductor switch 12 is permanently open in the normal operating mode.

Figure 3:
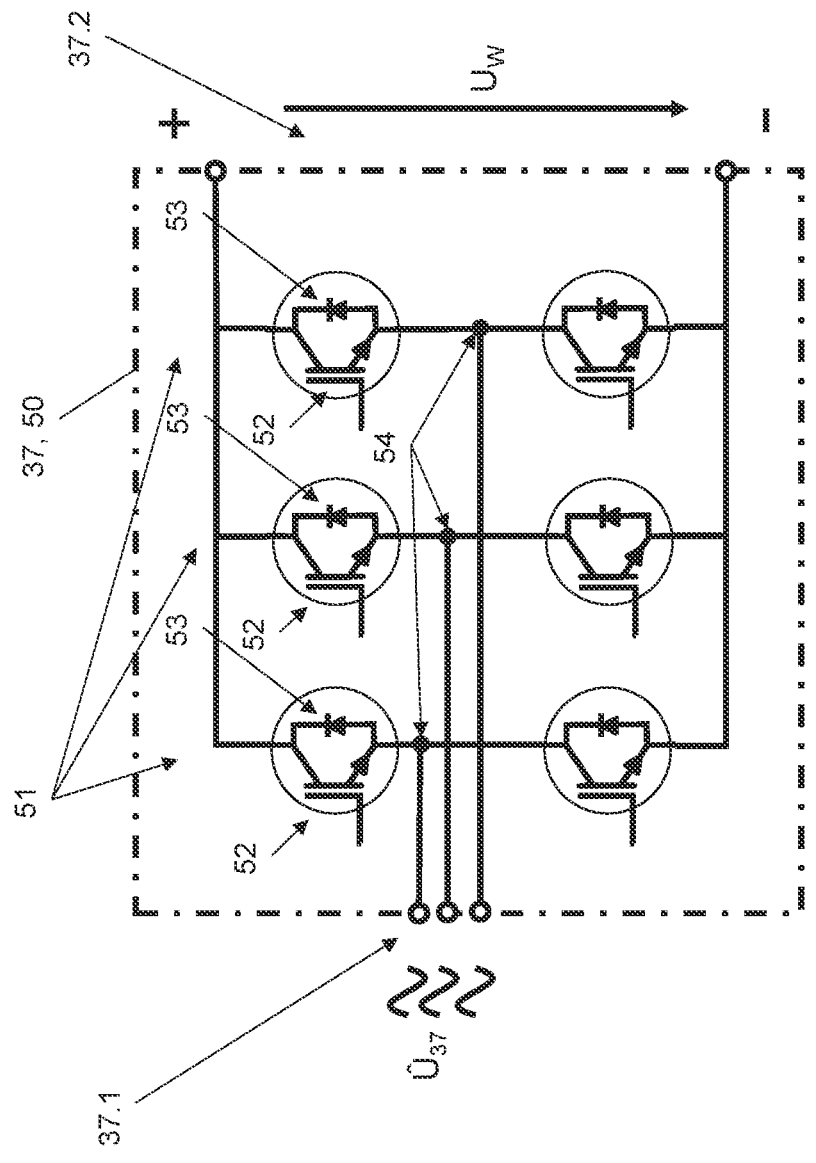
FIG. 3 shows a circuit topology of an AC/DC converter of the actively controlled rectifier circuit according to the disclosure in one embodiment.

FIG. 3 illustrates one embodiment of an AC/DC converter 37 of the actively controlled rectifier circuit 30 from FIG. 1. In a manner corresponding to the rectifier circuit 30 from FIG. 1, the AC/DC converter 37 is configured, for example, as a three-phase AC/DC converter 37 without a separate neutral connection and comprises a converter circuit 50 having a total of three bridge branches 51. Each of the bridge branches 51 has two series-connected semiconductor switches 52, each of which is assigned a freewheeling diode 53 connected in antiparallel. The freewheeling diode 53 may be an intrinsic diode of the respective semiconductor switch 52, or a separate diode. The semiconductor switches 52 may be MOSFET or IGBT semiconductor switches, for example. In a manner corresponding to the three-phase embodiment of the converter circuit 50, the AC converter input 37.1 of the AC/DC converter 37 comprises three input connections, which are each connected to a connection point 54 of the two semiconductor switches 52 of the bridge branch 51 assigned thereto. The DC converter output 37.2 of the AC/DC converter 37 comprises a positive (+) and a negative (−) output connection.

The AC/DC converter 37 is configured, when converting power, to transport active power P(t) from its AC converter input 37.1 to its DC converter output 37.2, and possibly also in the opposite direction from its DC converter output 37.2 to its AC converter input 37.1. The AC/DC converter 37 may additionally be configured to exchange reactive power Q(t) between the AC converter input 37.1 of the AC/DC converter 37 and an AC grid 20 (not illustrated explicitly in FIG. 3) connected to the AC converter input 37.1. For the purpose of the power conversion, the semiconductor switches 52 are appropriately driven by the rectifier control circuit 39 (not shown explicitly in FIG. 3) of the rectifier circuit. A level of the converted DC voltage $U_W$, in other words the DC voltage range, may in this case adopt values between a minimum DC voltage $U_{W,min}$ and a maximum DC voltage $U_{W,max}$. The minimum DC voltage $U_{W,min}$ is limited via the freewheeling diodes 53 to a value that—apart from a forward voltage of the freewheeling diodes 53—corresponds to the amplitude $U_{37}$ of the AC voltage present at the AC converter input 37.1. On account of the freewheeling diodes 53, the converter circuit 50 is thus able to generate a DC voltage $U_W$ at the DC converter output 37.2 that is larger, but not smaller, at least not significantly smaller than the amplitude $\hat{U}_{37}$ of the AC voltage present on the input side. The conversion losses in this case increase as the ratio of the DC voltage $U_W$ present on the output side to the amplitude $\hat{U}_{37}$ of the AC voltage present on the input side increases. In order then to reduce the conversion losses at high DC voltages, the AC voltage at the AC converter input 37.1, and thus also the minimum DC voltage at the DC converter output 37.2, may be above the no-load voltage $U_{LL}$ of the electrolyzer. This may be achieved, for example, through an appropriate design of a transformer 31 by way of which the AC/DC converter 37 is connected to the AC grid 20.

FIG. 3 shows one example of a two-level converter circuit 50 having only two voltage levels. However, a converter circuit 50 having more than two voltage levels, for example a three-level or five-level converter circuit, is also possible within the scope of the disclosure. It is furthermore possible, within the scope of the disclosure, for the converter circuit to be configured as a center tap circuit. In this case, an output connection, for example the negative output connection (−), of the DC converter output 37.2 may be connected to a center tap of a transformer 31 connected to the AC converter input 37.1. As an alternative, the negative output connection (−) may also be connected to a neutral conductor of the AC grid 20.

Figure 4:
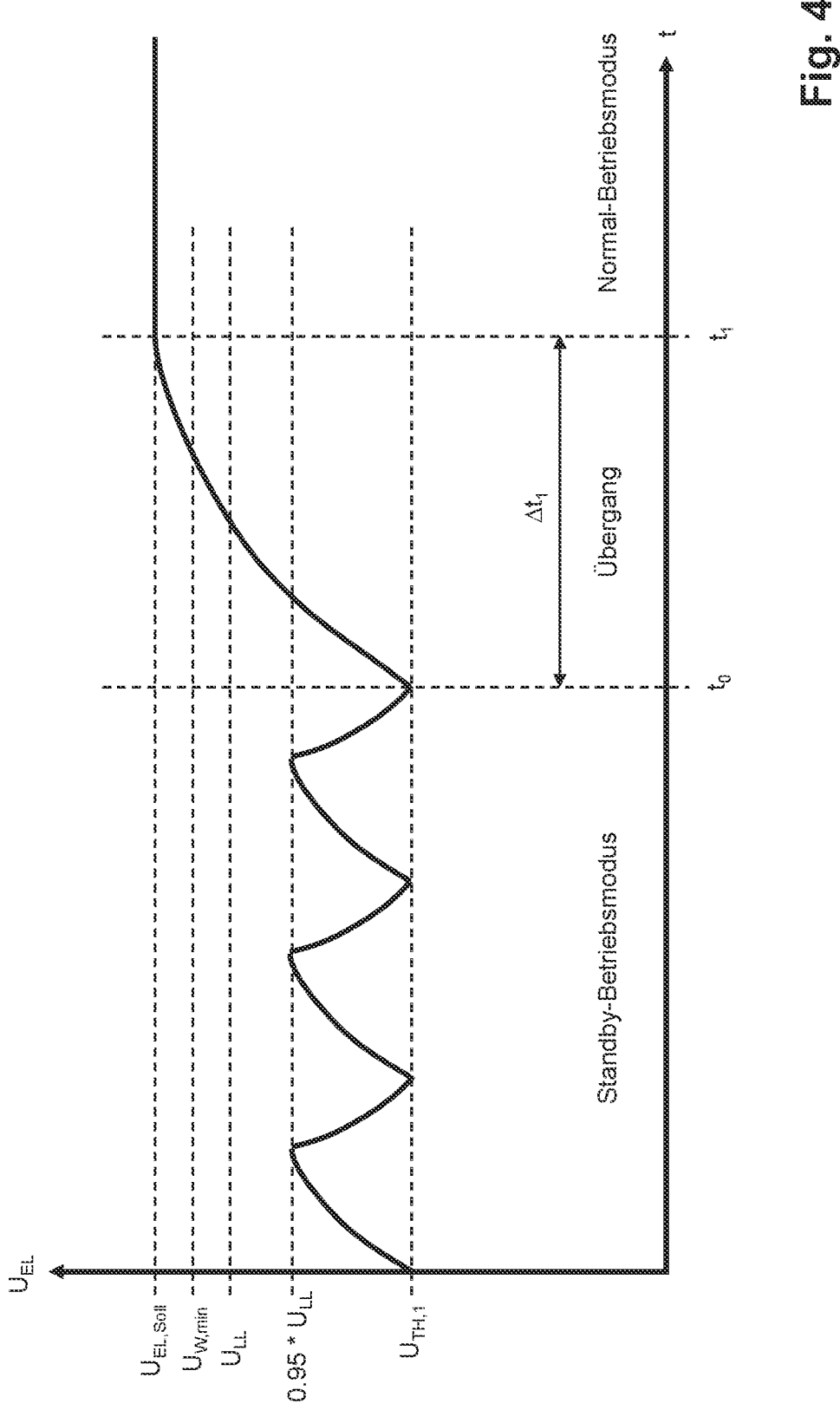
FIG. 4 shows a temporal profile of an input voltage $U_{EI}$ at the input of the electrolyzer according to one embodiment of the method according to the disclosure.

FIG. 4 illustrates a temporal profile of the input voltage $U_{EI}$ of the electrolyzer 40 during a transition from its standby operating mode to its normal operating mode according to one embodiment of the method according to the disclosure. FIG. 4 also illustrates temporal profiles of the input voltage UES as may occur in the standby operating mode chronologically before the transition and in the normal operating mode chronologically after the transition using the connection circuit 1 from FIG. 2a, for example.

In the standby operating mode, the input voltage $U_{EI}$ as a function of time has a sawtooth-like profile that moves between a lower limit value—formed from the first voltage threshold value $U_{TH,1}$—and an upper limit value. The upper limit value is in this case chosen such that it corresponds to 95% of the no-load voltage $U_{LL}$ of the electrolyzer 40. The sawtooth-like profile results from clocked closing and opening of the circuit breaker 3 with a permanently open further circuit breaker 4 of the connection circuit 1. It comprises temporary charging phases of the electrolyzer 40 during which the input voltage $U_{EI}$ rises. In this case, a capacitor assigned to the electrolyzer 40 is charged by means of the closed circuit breaker 3 of the connection circuit 1 and a current I(t) enabled thereby flowing through the precharging resistor 2. The rises in the input voltage $U_{EI}$ are each followed by discharging phases having voltage decreases associated therewith. The voltage decreases result from a leakage current within the electrolyzer 40 that cannot be completely prevented. In FIG. 4, the illustrated gradient of the voltage decreases is of a purely exemplary nature and may, depending on the level of the leakage current that occurs, also turn out to be significantly lower than illustrated in FIG. 4.

At the time to, it is signalled to the actively controlled rectifier circuit 30, for example, by an energy management system of a consumer facility comprising the electrolysis system 60, that the electrolyzer 40 should be put into its normal operating mode. For this purpose, the further circuit breaker 4 of the connection circuit 1 is closed and the electrolyzer 40 is connected with low resistance to the DC source 10, formed from the AC/DC converter 37 with the AC grid 20 connected upstream. At the same time, the semiconductor switches 52 of the AC/DC converter 37 are driven via the rectifier control circuit 39 such that the AC/DC converter 37 has a DC voltage at the DC converter output 37.2 that corresponds to a setpoint voltage value $U_{EI,Soll}$ that is desirable in the normal operating mode for its input voltage. Since the input voltage $U_{EI}$ of the electrolyzer 40 is already close to the no-load voltage $U_{LL}$ in the standby operating mode, only a significantly reduced voltage change is required until reaching the voltage setpoint value $U_{EI,Soll}$, and therefore also only significantly reduced charge transport into the electrolyzer 40 is required. The first transition duration $\Delta t_1$ between the standby operating mode and the normal operating mode is therefore significantly reduced in relation to precharging of the electrolyzer that takes place from 0 V. The same applies analogously to the second transition duration $\Delta t_2$ during a transition from the normal operating mode to the standby operating mode of the electrolyzer 40.

If, instead of the first embodiment of the connection circuit 1, the second embodiment according to FIG. 2b is used, then this results in a similar temporal profile as illustrated in FIG. 4. However, the sawtooth-like profile in the standby operating mode may have extremely small and negligible voltage differences, meaning that an approximately temporally constant DC voltage is able to be set there.

What is claimed is:

1. A method for operating an electrolyzer configured to generate hydrogen from water via an electrolysis reaction, and that is supplied with power from an AC voltage grid via an actively controlled rectifier circuit, wherein the electrolyzer has an input coupled to a DC converter output of an AC/DC converter, comprising:

operating the electrolyzer in a normal operating mode with an input voltage $U_{EI}$ applied thereto that is above a no-load voltage $U_{LL}$ of the electrolyzer, operating the electrolyzer in a standby operating mode with an input voltage $U_{EI}$ applied thereto that is below the no-load voltage $U_{LL}$ of the electrolyzer, and transitioning from the standby operating mode to the normal operating mode during a first transition duration $\Delta t_1$, wherein the first transition duration $\Delta t_1$ is dictated by keeping the input voltage $U_{EI}$ at an input of the electrolyzer during the standby operating mode above a non-zero first voltage threshold value $U_{TH,1}$, wherein the first voltage threshold value $U_{TH,1}$ corresponds to a value of at least 80% of the no-load voltage $U_{LL}$.

2. The method as claimed in claim 1, wherein the input voltage $U_{EI}$ at the input of the electrolyzer in the standby operating mode is kept at least 5% below the no-load voltage $U_{LL}$ of the electrolyzer.

3. The method as claimed in claim 2, further comprising:

transitioning from the normal operating mode to the standby operating mode during a second transition duration $\Delta t_2$, wherein the second transition duration $\Delta t_2$ is dictated by keeping the input voltage $U_{EI}$ at the input of the electrolyzer during the standby operating mode above the non-zero first voltage threshold value $U_{TH,1}$.

4. The method as claimed in claim 1, wherein the electrolyzer is additionally operated in a maintenance operating mode under specified boundary conditions, wherein in the maintenance operating mode the input voltage $U_{EI}$ of the electrolyzer is below a hazardous voltage value.

5. The method as claimed in claim 1, wherein the electrolyzer is assigned to a consumer facility and wherein operation of the electrolyzer and/or operation of components that supply electric power to the electrolyzer is controlled via a control circuit of the consumer facility that performs energy management.

6. The method as claimed in claim 5, wherein at least one change between the normal operating mode and the standby operating mode of the electrolyzer takes place during a calculation period with an aim of ensuring that a maximum energy $\Delta E$ agreed between the consumer facility and an energy supplier for the calculation period is not exceeded.

7. The method as claimed in claim 1, wherein a minimum DC voltage $U_{W,min}$ at the DC converter output of the AC/DC converter is above the no-load voltage $U_{LL}$ of the electrolyzer.

8. A method for operating an electrolyzer configured to generate hydrogen from water via an electrolysis reaction, and that is supplied with power from an AC voltage grid via an actively controlled rectifier circuit, comprising:

operating the electrolyzer in a normal operating mode with an input voltage $U_{EI}$ applied thereto that is above a no-load voltage $U_{LL}$ of the electrolyzer, operating the electrolyzer in a standby operating mode with an input voltage $U_{EI}$ applied thereto that is below the no-load voltage $U_{LL}$ of the electrolyzer, and transitioning from the standby operating mode to the normal operating mode during a first transition duration $\Delta t_1$, wherein the first transition duration $\Delta t_1$ is dictated by keeping the input voltage $U_{EI}$ at an input of the electrolyzer during the standby operating mode above a non-zero first voltage threshold value $U_{TH,1}$, wherein the input voltage $U_{EI}$ of the electrolyzer in the standby operating mode is kept above the first voltage threshold value $U_{TH,1}$ by connecting the input of the electrolyzer to a DC converter output of an AC/DC converter within the actively controlled rectifier circuit in a clocked manner via a precharging resistor and/or an inductor.

9. The method as claimed in claim 8, wherein the clocked connection of the input of the electrolyzer to the DC converter output is implemented using a two-point control.

10. The method as claimed in claim 8, wherein a minimum DC voltage $U_{W,min}$ at the DC converter output of the AC/DC converter is above the no-load voltage $U_{LL}$ of the electrolyzer.

11. The method as claimed in claim 8, wherein the electrolyzer is additionally operated in a maintenance operating mode under specified boundary conditions, wherein in the maintenance operating mode the input voltage $U_{EI}$ of the electrolyzer is below a hazardous voltage value.

12. The method as claimed in claim 8, wherein the electrolyzer is assigned to a consumer facility and wherein operation of the electrolyzer and/or operation of components that supply electric power to the electrolyzer is controlled via a control circuit of the consumer facility that performs energy management.

13. The method as claimed in claim 12, wherein at least one change between the normal operating mode and the standby operating mode of the electrolyzer takes place during a calculation period with an aim of ensuring that a maximum energy $\Delta E$ agreed between the consumer facility and an energy supplier for the calculation period is not exceeded.

14. The method as claimed in claim 8, wherein the input voltage $U_{EI}$ at the input of the electrolyzer in the standby operating mode is kept at least 5% below the no-load voltage $U_{LL}$ of the electrolyzer.

15. The method as claimed in claim 8, further comprising:

transitioning from the normal operating mode to the standby operating mode during a second transition duration $\Delta t_2$, wherein the second transition duration $\Delta t_2$ is dictated by keeping the input voltage $U_{EI}$ at the input of the electrolyzer during the standby operating mode above the non-zero first voltage threshold value $U_{TH,1}$.

* * * * *